Dec. 1, 1936.                R. STEFANCKY                2,062,841
                WHEEL AND METHOD OF PRODUCING THE SAME
                    Filed March 21, 1932        2 Sheets-Sheet 1
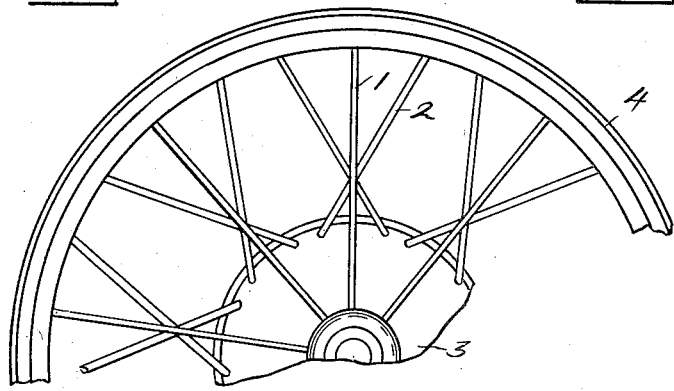
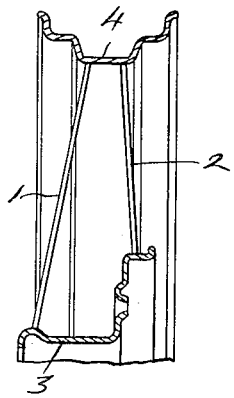
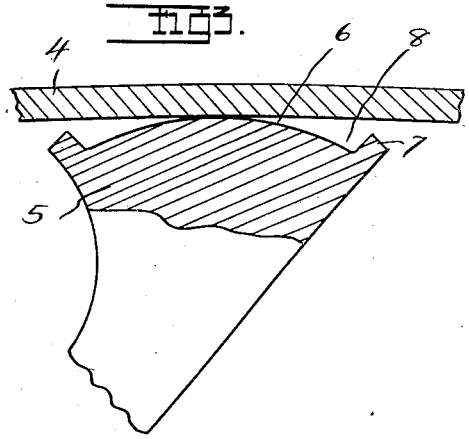
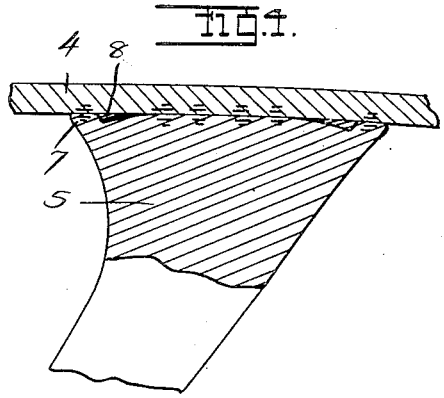
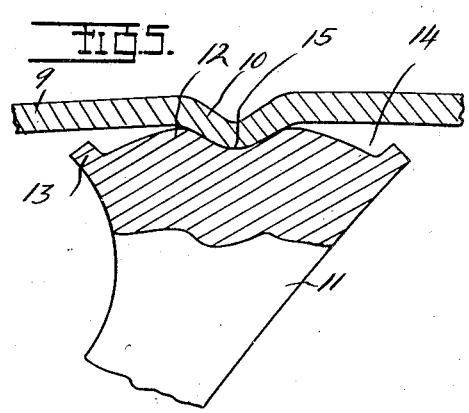
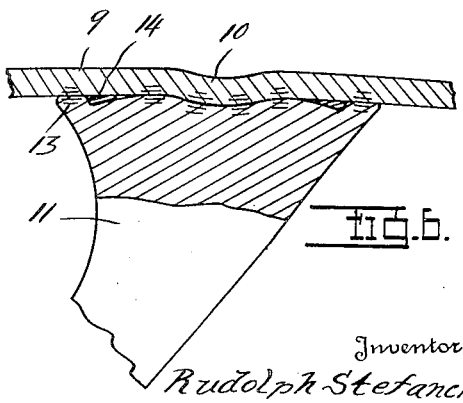
Inventor
Rudolph Stefancky

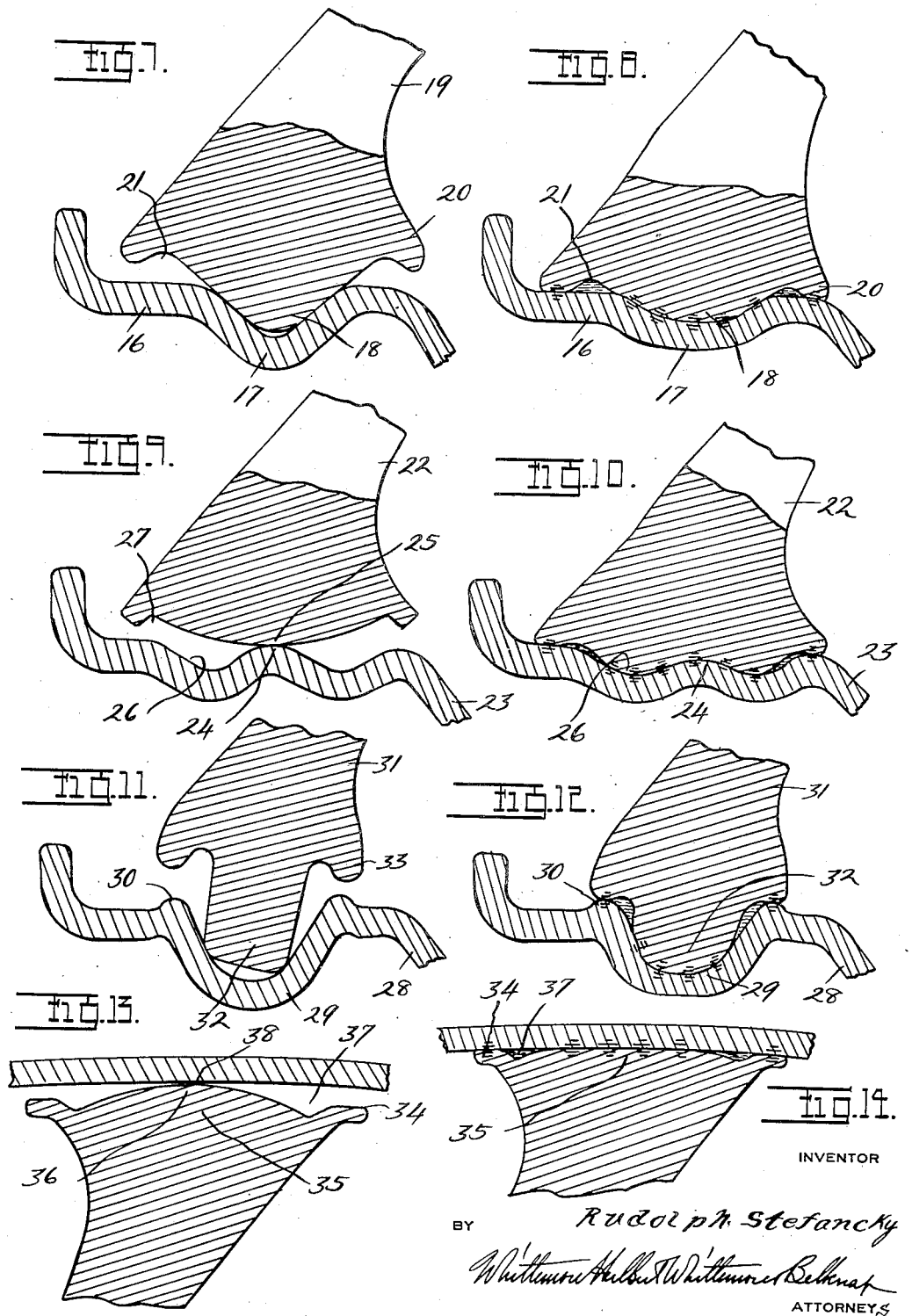

Patented Dec. 1, 1936

2,062,841

UNITED STATES PATENT OFFICE 2,062,841

WHEEL AND METHOD OF PRODUCING THE SAME

Rudolph Stefancky, Detroit, Mich., assignor, by mesne assignments, to The Kelsey-Hayes Wheel Company, Detroit, Mich., a corporation of Delaware Application March 21, 1932, Serial No. 600,282

2 Claims. (Cl. 301—104)

The invention relates to welded articles and refers more particularly to wire wheels of that type in which the spokes are welded to the hub member or the rim member, or both. One of the objects of the invention is to so construct the parts of a welded article that a strong, efficient welded joint is secured with the minimum of exposed flash, thereby greatly reducing the labor and expense involved in cleaning the article. Another object is to provide a simple, durable wire wheel of the above type which is less expensive to manufacture than wire wheels of the same type as heretofore made. Another object is to so construct the spoke and the wheel member, such as the hub member or the rim member, that a strong, efficient welded joint is secured with the minimum of exposed flash. A further object of the invention is to provide a novel method of producing a welded article and more particularly a wire wheel of this type.

These and other objects of the invention will become apparent from the following description, taken in connection with the accompanying drawings, in which Figure 1 is a front elevation of a wire wheel showing an embodiment of my invention;

Figure 2 is a cross section on the line 2—2 of Figure 1;

Figures 3 and 4 are enlarged sectional views showing the arrangement of a spoke and a wheel member, such as the rim member, respectively before and after the welding;

Figures 5 and 6 are views similar to Figures 3 and 4 respectively, showing another embodiment of my invention;

Figures 7 and 8 are views similar to Figures 3 and 4, respectively, showing another embodiment of my invention;

Figures 9 and 10 are views similar to Figures 3 and 4, respectively, showing another embodiment of my invention;

Figures 11 and 12 are views similar to Figures 3 and 4, respectively, showing another embodiment of my invention;

Figures 13 and 14 are views similar to Figures 3 and 4, respectively, showing another embodiment of my invention.

As illustrated in Figures 1 and 2, the wire wheel comprises the front and rear metal spokes 1 and 2 respectively, which are connected at their ends to the wheel members and which more particularly have their inner and outer ends abutting and welded to the hub member 3 and the rim member 4, both of which are preferably formed of sheet metal. The hub member is adapted to be detachably secured to an inner hub by suitable means and the rim member is a tire carrying rim which, as shown, is of the drop center type.

For the purpose of securing strong, efficient welded joints between the spokes and the wheel, or more particularly the hub and rim members, and at the same time securing welded joints with the minimum of exposed flashes to thereby decidedly reduce the labor and expense involved in cleaning the spokes and the wheel members at their junctions, I have devised the following construction and method of welding. This construction and method is the same at both the inner and outer ends of the spokes, with the exception that the wheel member in the first instance is the hub member and in the second instance the rim member. As illustrated in Figures 3 and 4, each spoke has the enlarged outer end 5 which is preformed by an upsetting operation prior to assembly with the rim member 4. This enlarged end is formed with the central radially outwardly extending rounded projection 6 and with the annular skirt 7 in the nature of an annular flange encircling and spaced from the projection and forming therewith the annular pocket 8. The projection 6 extends radially outwardly beyond the skirt 7, so that when the spoke is properly brought into contact with the rim member this projection engages the rim member and has an initial contact area with the rim member, which is appreciably less than the area of the completed weld. After the spoke has been brought into contact with the rim member a welding current is applied by suitable means, such as welding machine jaws applied to the spoke and rim member, and pressure is also applied to force the spoke toward the rim member, at which time the projection and the adjacent portion of the rim member are heated and fused together. During the welding operation the projection is flattened out and the metal displaced by this flattening flows into the pocket 8, which is of a sufficient size to receive the same. Also during the welding operation the skirt assumes a position in contact with or in close proximity to the rim member, so that this skirt conceals the flash resulting from the welding operation, at least to a very large extent, thereby eliminating to a decided extent the necessity of spending a large amount of time, labor and money in removing the flash, as was heretofore done.

Figures 5 and 6 disclose another modification in which the rim member 9 is provided with a radially inwardly extending depression 10 for use in locating each spoke. Each wire spoke 11 has its outer preformed end provided with the central radially outwardly extending projection 12 and the encircling annular skirt 13 spaced from this projection and forming the annular pocket 14, the arrangement thus far being the same as that described in Figures 3 and 4. The projection 12 is formed with the radially inwardly extending central depression 15 for engaging the rim member depression 10, the two cooperating to locate the spoke relative to the rim member. The flash resulting from the welding is taken care of by the pocket 14.

As shown in Figures 7 and 8, the wheel member illustrated is the hub member 16, which is provided with the radially inwardly extending depression 17 forming a recess for engaging the central radially inwardly extending projection 18 upon the inner enlarged end of each wire spoke 19, this projection being of greater height than the projection 6. The inner end of each spoke is also formed with the annular encircling skirt 20 which cooperates with the projection 18 to form the annular pocket 21 encircling the projection and adapted to receive the flash. With this arrangement, the spokes are located relative to the hub member and in this connection a similar arrangement at the outer ends of the spoke, in which case the rim member will be provided with spoke locating radially outwardly extending depressions, may be used.

As shown in Figures 9 and 10, the inner end of each wire spoke 22 is formed in the same manner as shown in Figures 3 and 4, but the wheel member which, as shown, is the hub member 23, is fashioned to provide additional space for receiving the flash within the confines of the spoke end skirt. In detail, this hub member is formed with the radially outwardly extending projection 24 for contacting with the radially inwardly extending projection 25 of the enlarged spoke end. The hub member is also formed with the annular recess or pocket 26 encircling the projection 24 and registering with the pocket 27 in the spoke end, these two pockets together being adapted to receive the flash, so that with this construction no cleaning of the spokes and wheel member at their junctions is required.

As shown in Figures 11 and 12, the wheel member is the hub member 28 which is formed with the radially inwardly extending depression 29 providing a recess which in section is substantially U-shaped. The hub member is also formed with the radially outwardly extending bead 30 at the junction of the depression 29 with the body portion of the hub member. The wire spoke 31 is formed with the central radially inwardly extending projection 32 which is substantially cylindrical, so that when the lower end of this projection engages and is centered in the depression 29 clearance is provided between the wall of this projection and the depression above the lower end of the projection. The end of the spoke is also provided with the annular skirt 33 which encircles and is spaced from the projection 32 and which is of a size to register with the bead 30. It will be seen that with this construction enlarged space is also provided for receiving the flash.

Figures 13 and 14 disclose a modification differing from that shown in Figures 3 and 4 mainly in the provision of a flat annular flange 34 which surrounds the enlarged end 35 of the spoke and which encircles the central projection 36 of the spoke and is spaced from and forms with this projection the annular pocket 37 for receiving the flash. By reason of the flat annular flange a more finished appearance is given to the wheel and furthermore flash is better retained in the pocket, since the flat annular flange offers a restricted area at the edge of the skirt which is formed by this flange. Also the flat annular flange gives the spoke engaging jaw or die a better hold on the skirt to draw it down more uniformly about the weld flash. As shown in this modification, one of the enlarged ends of each spoke is also provided with the boss or point 38 extending outwardly from the central projection 36 to indicate whether the particular end of the spoke having this boss or point is the inner end or the outer end, so that assembling of the spokes with the hub and rim members is greatly facilitated and made more accurate.

From the above description, it will be seen that I have provided a simple, durable, welded type wire wheel which may be produced at less cost than a standard wheel of this type heretofore made. It will also be seen that with my method strong, efficient joints are provided between the spokes and the wheel member or members with the minimum of exposed flash, so that the time, labor and expense involved in cleaning the spokes and the wheel member or members at their junctions is materially reduced.

What I claim as my invention is:

1. A wheel spoke adapted to be butt welded in a diagonal position to a hub and rim member, respectively, comprising, a rod having its ends flared out so as to form conical shaped end portions, the bases of said conical portions forming the ends of said spoke, said bases extending diagonally to each other and to the axis of the spoke with the diagonal base portions disposed tangent to the rim and hub member, respectively at the intersections therebetween, said bases being slightly convex and each having an integral annular ring extending therearound, for the purpose described.

2. A wheel spoke adapted to have its ends butt welded to a hub and rim, comprising a rod having its ends formed into substantially conical heads of greater diameter than the rod, the bases of said heads being convex and each base being surrounded by an integral annular ring, the convexity of the bases being such that the central portions of the bases extend axially a short distance beyond the rings whereby initial welding contact is made by the central portion of said convex portions, the area of the welds gradually increasing as the convex portions flatten, said areas finally extending over the entire base portions.

RUDOLPH STEFANCKY.